United States Patent [19]

Wuenscher

[11] Patent Number: 5,562,017
[45] Date of Patent: Oct. 8, 1996

[54] REUSABLE PRESS FIT CONNECTION OF A HYDRAULIC POWER APPARATUS AND METHOD OF ASSEMBLY

[75] Inventor: Bernd F. Wuenscher, Lebanon, Tenn.

[73] Assignee: TRW Inc., Lyndhurst, Ohio

[21] Appl. No.: 423,286

[22] Filed: Apr. 17, 1995

[51] Int. Cl.$^6$ .................... F15B 9/10; F15B 15/22
[52] U.S. Cl. .................... 91/375 A; 91/401; 92/13.5; 29/890.124; 29/888.048
[58] Field of Search ............ 91/375 R, 375 A, 91/401; 92/181 P, 13, 13.5, 13.6, 13.8; 29/888.044, 888.048, 888.41, 888.45, 890.12, 890.124

[56] References Cited

U.S. PATENT DOCUMENTS

| | | | |
|---|---|---|---|
| 3,515,599 | 6/1970 | Connelly . | |
| 4,648,307 | 3/1987 | Rabe . | |
| 4,773,303 | 9/1988 | Stroud | 92/13 X |
| 4,836,695 | 6/1989 | Baureis et al. . | |
| 4,872,393 | 10/1989 | Rabe et al. | 91/375 A |
| 5,207,244 | 5/1993 | Behrens et al. . | |
| 5,239,955 | 8/1993 | Rao et al. | 29/888.048 |
| 5,259,413 | 11/1993 | Harpole et al. . | |
| 5,322,142 | 6/1994 | Elser | 92/13.8 X |

*Primary Examiner*—Hoang Nguyen
*Attorney, Agent, or Firm*—Tarolli, Sundheim, Covell, Tummino & Szabo

[57] ABSTRACT

An apparatus (10) including a housing (14) defining a chamber (16) and a movable piston (18, 100) dividing the chamber (16) into first and second chamber portions (20, 22). An apparatus (38, 40) directs fluid pressure into either the first or second chamber portion and vents the other to effect movement of said piston (18, 100). A relief valve (12) communicates the first and second chamber portions (20, 22) when the piston (18, 100) is near the end of its work stroke. The relief valve (12) includes a valve member (76) and a valve seat (74) which are relatively movable between open and closed positions. A method is performed to make the apparatus and includes forming a press-fit connection between the piston means (18, 100) and the valve seat (74). The press-fit connection prevents relative movement between the valve seat (74) and the piston (18, 100) during application of force to the valve seat (74) less than a predetermined amount and permits relative movement between the valve seat (74) and said piston (18, 100) during application of force to the valve seat (74) greater than the predetermined amount. Preferably, zinc phosphate (80a) is placed on the valve seat (74) at the connection for resisting seizing of the valve seat (74) and the piston (18, 100) at the connection.

20 Claims, 3 Drawing Sheets

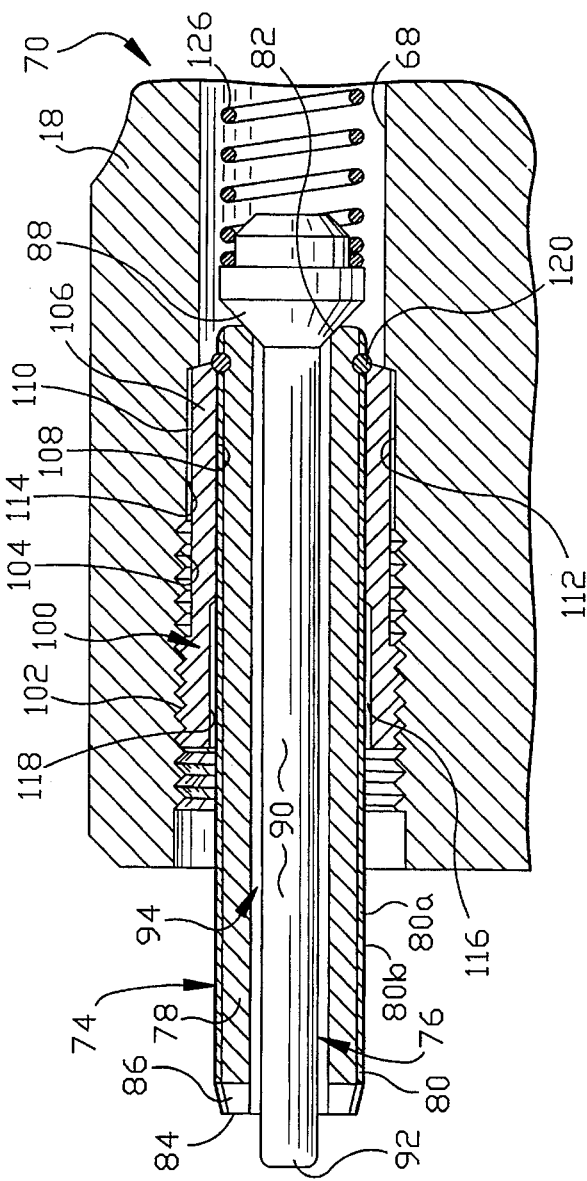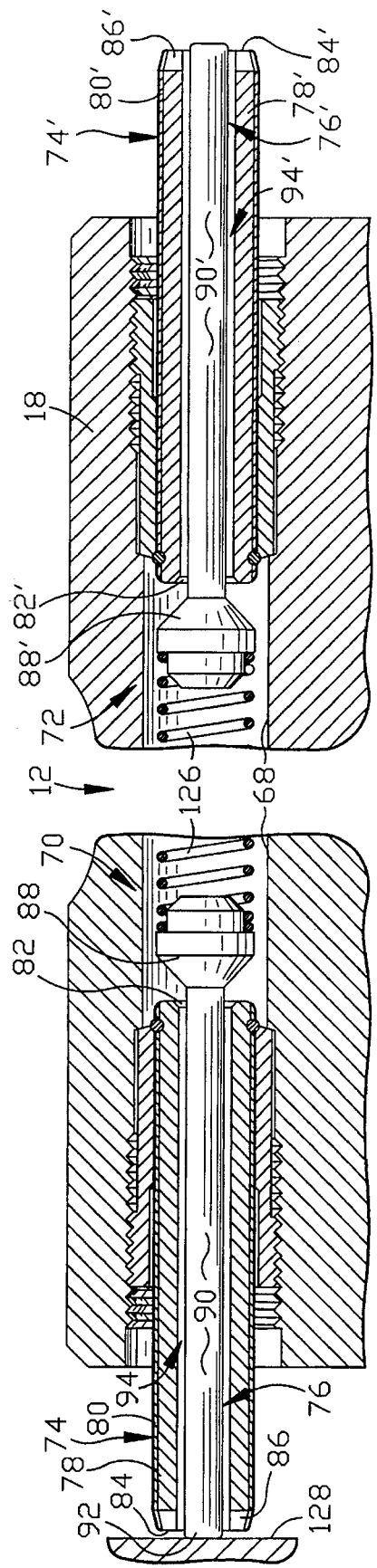
FIG. 2
FIG. 3

5,562,017

REUSABLE PRESS FIT CONNECTION OF A HYDRAULIC POWER APPARATUS AND METHOD OF ASSEMBLY

BACKGROUND OF THE INVENTION

The present invention relates to a hydraulic mechanism and particularly to a hydraulic power assist steering gear.

Hydraulic power assist steering gears are well known. Typically, such steering gears include a housing which defines a chamber. A piston divides the chamber into first and second chamber portions. The piston is movable in a work stroke within the chamber due to fluid pressure. A steering valve directs fluid into one of the chamber portions and vents the other chamber portion to effect movement of the piston in a given direction. An input shaft is rotated by the driver of the vehicle to effect actuation of the steering valve. The piston is drivingly connected to a vehicle steering mechanism to effect actuation thereof upon movement of the piston.

The vehicle steering mechanism has stops which limit the amount of movement of the steered wheels in both directions of turning. Typically, a stop is fixed to the axle and another stop is movable with the steered wheel and can engage the stop fixed to the axle to limit movement of the steered wheels in one direction. Similar stops engage to limit movement of the steered wheels in the opposite direction. The amount of movement of the steered wheels before the stops engage may vary from vehicle to vehicle because of manufacturing tolerance and other factors. The piston in the power steering gear moves through a work stroke, the length of which is proportioned to the amount of movement of the steered wheels before the stops engage.

A known steering gear includes relief valves which are carried by the piston. The relief valves, commonly known as end-of-stroke relief valves, allow fluid communication between the chamber portions on opposite sides of the piston as the piston approaches the end of its work stroke in either direction and just prior to engagement of the stops. The relief valves prevent high pressure build-up which could damage the steering gear.

The location of the piston when a relief valve opens is important because the relief valve is to open just prior to engagement of the steering mechanism stops. The relief valve is adjustable to change the location that the piston will reach prior to opening of the relief valve. Over the life of a relief valve, several adjustments may be necessary.

SUMMARY OF THE INVENTION

The present invention is directed to an apparatus which has a housing defining a chamber, and which has piston means dividing the chamber into first and second pressure chamber portions. The piston means is movable through a work stroke in opposite directions in the chamber. A means directs fluid pressure into the first chamber portion and vents the second chamber portion to effect movement of the piston means in a first direction, and also directs fluid pressure into the second chamber portion and vents the first chamber portion to effect movement of the piston means in a second direction.

Relief valve means communicates the first and second chamber portions when the piston means is near the end of its work stroke. The relief valve means includes a valve member and a valve seat which are relatively movable between a closed position blocking communication between the first and second chamber portions and an open position establishing communication between the first and second chambers when said piston means reaches the end of its work strode. A method is performed to make the apparatus and includes forming a press fit connection between the piston means and the valve seat. The connection prevents relative movement between the valve seat and the piston means during application of force to the valve seat less than a predetermined amount and permits relative movement between the valve seat and the piston means during application of force to the valve seat greater than the predetermined amount.

Preferably zinc phosphate is on one of the valve seat and the piston means at the connection for resisting seizing of the valve seat and the piston means at the connection. In a preferred embodiment, oil is also between the valve seat and the piston means at the connection.

BRIEF DESCRIPTION OF THE DRAWINGS

Further features of the present invention will become apparent to those skilled in the art to which the present invention relates from reading the following specification with reference to the accompanying drawings, in which:

FIG. 2 is an enlarged sectional view of a portion of a relief valve system of the steering gear of FIG. 1;

FIG. 3 is a sectional view of the relief valve of the steering gear of FIG. 1 with parts in an operational position;

DESCRIPTION OF PREFERRED EMBODIMENT

Figure 1:
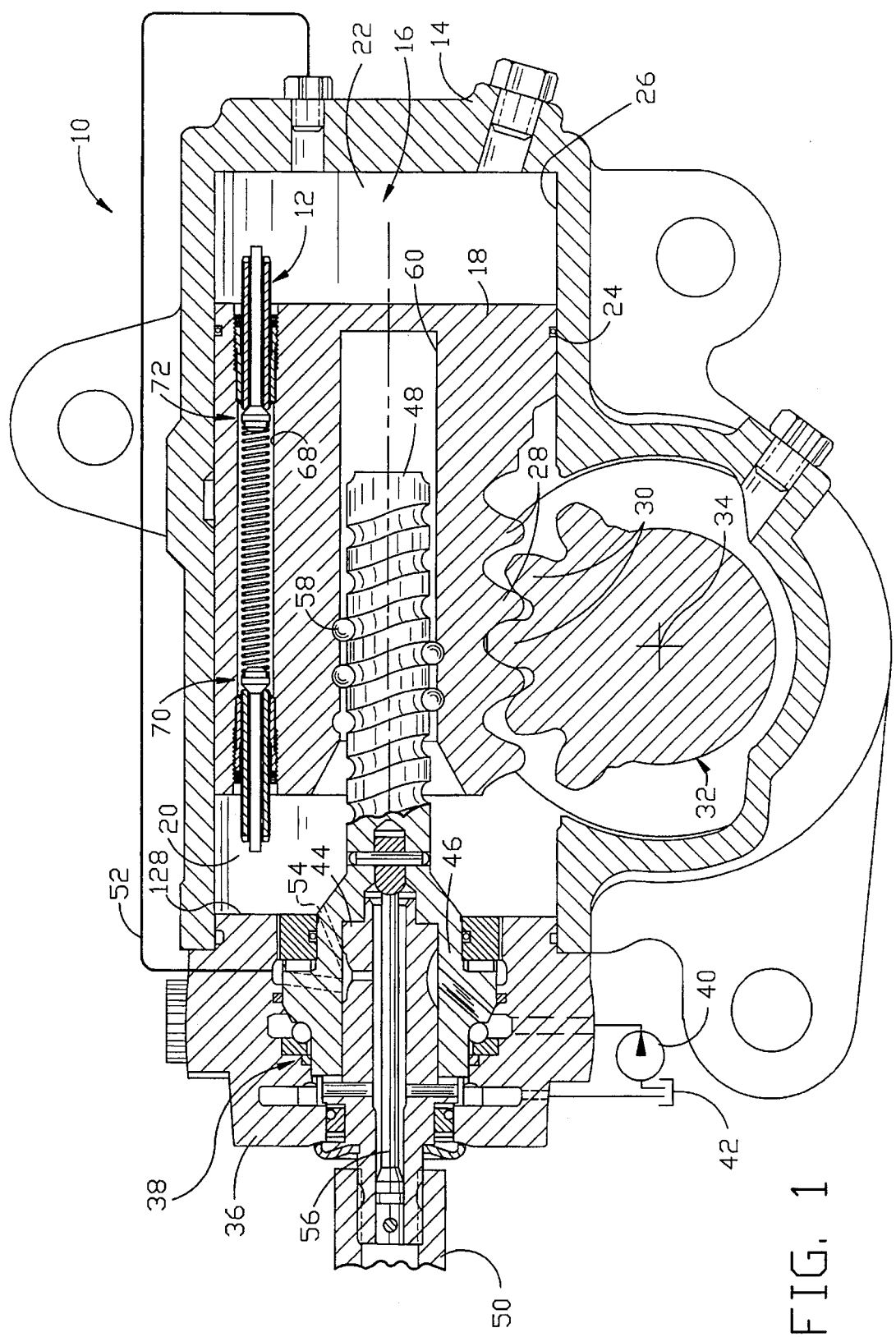
FIG. 1 is an axial cross-sectional view of a steering gear which includes the present invention.

The present invention relates to a hydraulic power apparatus 10 (FIG. 1) which may be used to control fluid flow associated with mechanisms of a variety of constructions and uses. Preferably, the apparatus 10 is a power steering gear which provides power assistance for steering dirigible wheels (not shown) of a vehicle (not shown) in opposite directions to effect steering of the vehicle. Specifically, the present invention is directed to an adjustable relief valve system 12 of the power steering gear 10 and a method of assembly.

The steering gear 10 includes a metal housing 14. The housing 14 defines a cylindrical chamber 16 in which a metal piston 18 is located. The piston 18 divides the chamber 16 into chamber portions 20 and 22. The piston 18 carries a seal 24 in running contact with a surface 26, which partially defines chamber 16. The seal 24 hydraulically separates the chamber portions 20 and 22.

The outer periphery of a portion of the piston 18 includes a plurality of gear teeth 28. The gear teeth 28 mesh with gear teeth 30 of a sector gear 32. Movement of the piston 18 causes the sector gear 32 to rotate about an axis 34.

The sector gear 22 is on a portion of an output shaft which extends outwardly from the power steering gear 10 through an opening (not shown) in the housing 14. The output shaft is typically connected to a pitman arm (not shown) which in turn is connected to a mechanical steering linkage (not shown) of the vehicle. Thus, as the piston 18 moves in the chamber 16, the sector gear 32 and output shaft are rotated to operate the steering linkage as will be understood by those skilled in the art.

The chamber 16 of the housing 14 is enclosed at one end by a valve housing portion 36. The valve housing portion 36 contains a power steering valve 38. The valve 38 is of conventional construction and will not be described in detail. U.S. Pat. Nos. 5,207,244 and 5,259,413, both assigned to TRW, Inc., Lyndhurst, Ohio, disclose similar valves and are hereby incorporated herein by reference.

In general, operation of the valve 38 controls the flow of pressurized hydraulic fluid from a pump 40 (shown schematically) into one chamber portion 20 or 22 while venting the other chamber portion 20 or 22 to a reservoir 42 (shown schematically). The pressurized fluid moves the piston 18 along a work stroke to the right or left, as viewed in FIG. 1, to provide a power assist for steering the vehicle.

The valve 38 includes two valve parts 44 and 46. The valve parts 44 and 46 are rotatable relative to each other and are rotatable relative to the valve housing 36. A torsion bar 56 is located between the valve parts 44 and 46 of the valve 38. One end of the torsion bar 56 is fixedly attached to the valve part 44. The other end of the torsion bar 56 is fixedly attached to the valve part 46. The torsion bar 56 bias the valve parts 44 and 46 toward a neutral position.

The valve part 44 is connected to a steering input shaft 50 which is connected to a vehicle steering wheel (not shown). The input shaft 50 is rotated about its own axis upon rotation of the steering wheel. When the input shaft 50 rotates, it rotates the valve part 44 relative to the valve part 46 against the bias of the torsion bar 56.

Upon relative rotation between the valve parts 44 and 46, pressurized fluid from the pump 40 is conducted to either the chamber portion 20 or the chamber portion 22 depending on the rotation direction of the input shaft 50. Specifically, pressurized fluid may be directed from the valve 38 through a housing passage 52 (shown schematically) in communication with the chamber 22. Alternatively, the pressurized fluid may flow into the chamber 20 through passages 54 (only one shown, in phantom) in the valve part 46. If the fluid flows into the chamber portion 22, the chamber portion 20 is vented to the reservoir 42 through the passages 54 and the valve 38. If the fluid flows into the chamber portion 20, the chamber portion 22 is vented to the reservoir 42 through the passage 52 and the valve 38.

The valve part 46 is formed as a unit with a screw shaft 48. The screw shaft 48 is located in a bore 60 which partially extends through the piston 18. Balls 58 are interposed between the outer diameter of the screw member 48 and the inner diameter of the bore 60. The balls 58 cause the screw shaft 48 and the valve part 46 to rotate in a "follow up" manner. Specifically, as the piston 18 moves in the chamber 16, the piston 18 will effect rotation of the screw shaft 48, which in turn will cause movement of the valve part 46 back toward the neutral position relative to the valve part 44 so as to stop the flow of fluid to the chamber portion 20 or 22 when steering wheel rotation has been terminated.

Also, the amount of relative rotation between the valve parts 44 and 46 is limited. When this rotational limit is reached in one direction of relative rotation, 10 interengaging parts (now shown) of the valve parts 44 and 46 become engaged in that direction. In the event of a hydraulic failure in the power assist system, such as a failure of the power steering pump, the valve part 44 rotates relative to valve part 46 to its limit.

Specifically, upon rotation of the input shaft 50, the valve part 44 will rotate relative to the valve part 46, against the bias of the torsion bar 56 until the interengaging parts engage. The valve parts 44 and 46 are then drivingly engaged and further rotation of the input shaft 50 will cause the screw member 48 to rotate. As the screw member 48 rotates, the balls 58 will effect a transverse or axial movement of the piston 18 in the chamber 16, depending upon the direction of the turning of the input shaft 50. As a result, steering of the vehicle can occur in the appropriate direction without hydraulic assistance.

Vehicles in which the steering gear 10 is used have steering stops (not shown) to limit the amount of steering angle displacement of the steered wheels of the vehicle. These steering stops are typically located on the axle (not shown) of the vehicle and on the spindles (not shown) of the vehicle which support the steered wheels and which move with the steered wheels during steering. The steering displacement distance that the spindles can move before the steering stops engage may vary from vehicle to vehicle, because of tolerances in the manufacture of vehicles.

The steering displacement of the spindle is related to rotational displacement of the sector gear 32 which in turn is related to axial displacement of the piston 18. As a result, the amount of axial movement of the piston 18, necessary to effect a complete stop-to-stop range of steering, may vary from vehicle to vehicle, even in closely related vehicle models. The amount of movement of the piston 18 should be proportional to the maximum amount of steering displacement of the steered wheels of the vehicle before the steering stops engage.

In order to insure that piston movement ceases when the steering stops engage, the relief valve system 12 is provided. The relief valve system 12 is carried by the piston 18 and functions to relieve the excess pressure in either chamber portion 20 or 22 depending upon which chamber has fluid pressure being directed to it. Specifically, the relief valve system 12 operates to vent the pressurized chamber portion 20 or 22 to the non-pressurized chamber portion just prior to engagement of the steering stops. As a result, the steering mechanism, the gear teeth 28, the gear teeth 30, and the pump 40 are protected from repeated hydraulic and/or mechanical loads transmitted thereto.

The relief valve system 12 is located in a bore 68 in the piston 18. The bore 68 extends through the piston 18 between the chamber portions 20 and 22 and provides a passage through which fluid may flow between the chamber portions 20 and 22. The relief valve system 12 includes two relief valves 70 and 72. The relief valve 70 is located at the chamber portion 20 and the relief valve 72 is located at the chamber portion 22. The relief valve 70 and 72 are of identical construction. Thus, only the relief valve 70 (FIG. 2, enlarged) will be described in detail. Corresponding reference numerals will be used to identify similar parts of the relief valves 70 and 72 (FIG. 3) with a prime added to reference numerals for the parts of the relief valve 72.

The relief valve 70 (FIG. 2) includes a cylindrical tube-shaped valve seat 74 and a valve member 76. The valve seat 74 includes a cylinder-shaped tube 78 which is made of metal. The tube 78 is hollow along its extent. The tube 78 has a truncated, concave conical face 82 at one end which tapers radially inward as the face 82 extends axially inward. At the other end 84 of the tube 78, a diametric slot 86 extends across the entire width of the tube 78.

The outer cylindrical surface of the tube 78 has a coating 80. The coating 80 includes a layer of zinc phosphate 80*a* covering and adhered to the outer cylindrical surface of the tube 78, and a coating of oil 80*b* on the layer of zinc phosphate 80*a*. The thickness of the zinc phosphate 80*a* of the coating 80 shown in the drawings is exaggerated for illustration purposes. In the preferred embodiment, zinc phosphate is applied to the tube 78 at 100 mg. per square foot of surface area of the tube 78 to provide the layer 80*a*. The coating of oil 80*b* is represented in the drawings by a thickened line on the exterior of the layer of zinc phosphate 80*a* and is also exaggerated for illustration purposes. In the preferred embodiment, the type of oil used to create the layer 80*b* is CASTROL (T.M.) DWX-61.

The valve member 76 is made of metal. The valve member 76 has a head portion 88 which is shaped as a truncated cone. The head portion 88 is engageable with the conical face 82 at a closed position of the valve seat 74 to effect a seal and prevent a flow of hydraulic fluid.

A cylindrical elongate portion 90 of the valve member 76 extends coaxially through the tube 78 of the valve seat 74. A tip portion 92 of the elongate portion 90 is located at the end remote from the head portion 88. The tip portion 92 extends beyond the tube 78 when the head portion 88 engages the conical face 82. The elongate portion 90 has a diameter less than an inner diameter of the tube 78 such that a clearance 94 is provided to permit a flow of hydraulic fluid through the interior of the entire length of the tube 78. This clearance 94 also intersects with the slot 86 of the tube 78.

The valve seat 74 is supported in the bore 68 of the piston 18 by a tubular connector 100. A threaded portion 102 of the connector 100 is located at one end of the connector 100. The threaded portion 102 threads into a threaded portion 104 of the bore 68 such that the connector 100 is held stationary relative to the piston 18. The connector 100 and piston 18 cooperate to carry the relief valve 70 during movement of the piston 18. Thus, the connector 100 can be referred to as a piston element, and the piston 18 and the connector 100 can be referred to as a single piston unit with respect to the relief valve system 12.

The connector 100 has an end portion 106 with an internal diameter 108 which is press-fit onto the outer diameter of the valve seat 74 during assembly. Specifically, the end portion 106 is press-fit in engagement with the coating 80. The outer diameter of the coating 80 of the valve seat 74 prior to assembly is slightly larger than the internal diameter 108 of the threaded connector 100. For example, the size difference may be 0.0002–0.003 inch depending upon the materials of which the tube 78 and the connector 100 are made.

Figure 4:
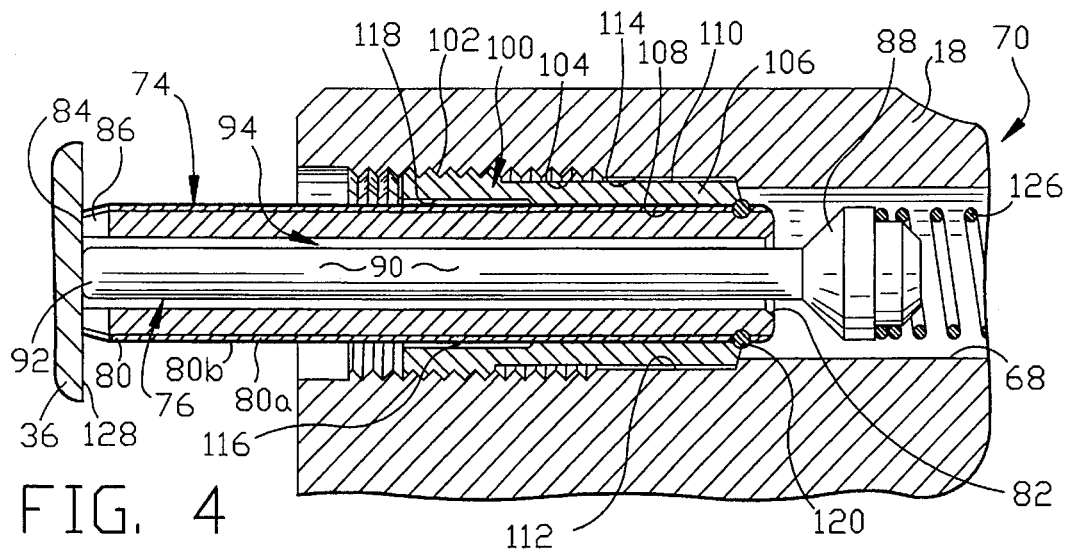
FIG. 4 is a view similar to FIG. 2 with parts in a first adjusting position.
Figure 5:
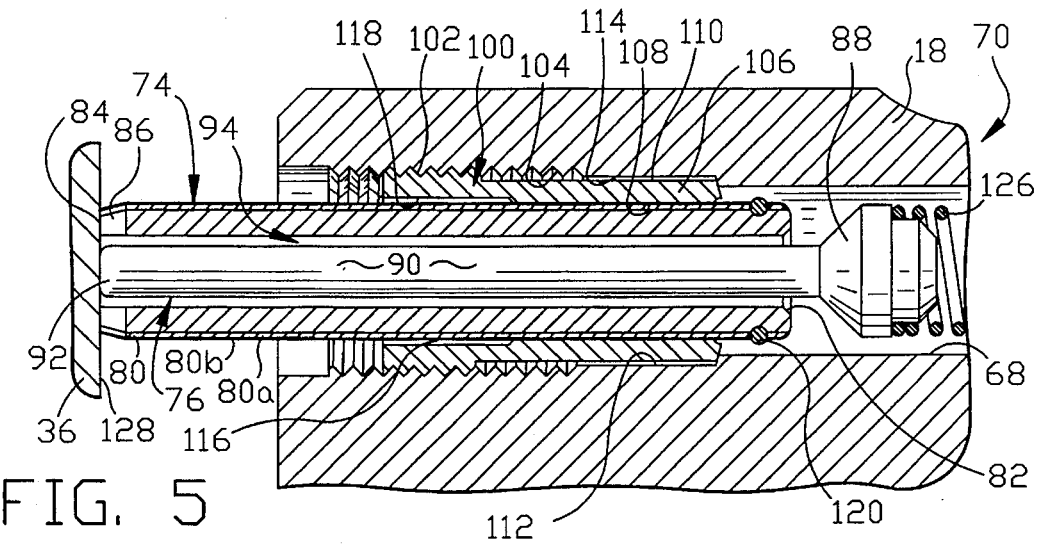
FIG. 5 is a view similar to FIG. 2 with parts in a second adjusting position.
Figure 6:
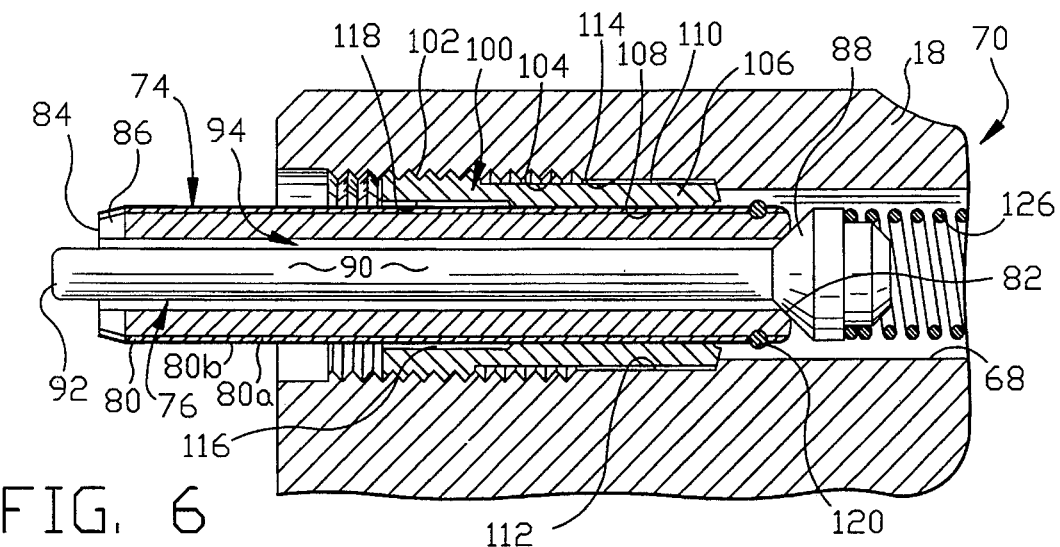
FIG. 6 is a view similar to FIG. 2 with parts in an adjusted position.

The valve seat 74 and the connector 100 can be assembled by a mechanical pressing force or by elevating the temperature of the connector 100 so that it expands enough to slip over the valve seat 74 and then allowing it to cool and shrink onto the valve seat 74. The press-fitting by mechanical pressing force causes a burnishing effect. However, none of the metal of the tube 78 is removed, regardless of the method of press-fitting, because of the coating 80. The width of the thickened line representing the layer of oil 80*b* is illustrated as having a constant width along the valve seat 78, however, a portion of the layer of oil 80*b* may be squeezed off at the press-fit connection. The press-fit connection enables the valve seat 74 to be adjusted relative to the connector 100, and thus the piston 18 (FIGS. 4–6).

An external diameter 110 (FIG. 2) of the end portion 106 of the connector 100 is smaller than the major and minor diameters of the threaded portion 104, and also is smaller than an internal diameter 112 of the segment of the bore 68 in which the end portion 106 is located. This provides a clearance 114 between the end portion 106 and the piston 18. There is a similar clearance 116 between a portion of the valve seat 74 and an internal diameter 118 of the connector 100 at the threaded portion 102 because the internal diameter 118 is larger than the internal diameter 108 and larger than the outer diameter of the valve seat 74. These clearances 114 and 116 assure that the threaded portion 102 will not be deformed due to the press-fit.

A retaining ring 120 is fixed on the tube 78 of the valve seat 74 to limit the amount of movement of the valve seat 74 into the connector 100 during assembly. During initial press-fitting of the valve seat 14 into the connector 100, the retainer ring 120 is seated against the 10 connector 102.

The connector 100 is threaded into the bore 68 of the piston 18. The end of the poppet valve 70 with the conical face 82 and the head portion 88 is within the piston 18. The connector 100 is tightened into the bore 68 far enough such that only a portion of the valve seat 74 projects out of the end of the piston 18.

A compression spring 126 (FIG. 3) is located in the bore 68. The ends of the spring 126 engage against the head portions 88 and 88' of the respective valve members 76 and 76'. The spring 126 bias each valve member 76, 76' into engagement with its respective valve seat 74, 74' the closed positions, to prevent fluid flow through the bore 68. When the head portion 88 is moved away from the conical face 82 of the relief valve 70 and the head portion 88' is moved away from the conical face 82' of the relief valve 72, the relief valves 70 and 72 are in open positions and fluid can communicate between the chamber portions 20 and 22 through the relief valves 70 and 72, and the bore 68.

During operation, the piston member 18 (FIG. 1) is moved toward the left when pressurized hydraulic fluid is directed by the valve 38 toward the chamber portion 22. When the piston 18 moves to the left (as shown in FIG. 3) near the end of its work stroke, the tip portion 92 of the valve member 76 engages a housing wall 128. Upon continued movement of the piston 18 to the left the valve member 76 moves relative to the valve seat 74 causing the head portion 88 to move away from the conical face 82 of the valve seat 74 to the open position. This allows fluid to flow along the passage 94 and past the head portion 88, and establishes fluid communication between the chamber portion 20 and the portion of the bore 68 between the relief valves 70 and 72. The slot 86 allows communication to be maintained between the chamber portion 20 and the passage 94 when the end 84 of the valve seat 74 engages the wall 128.

The fluid pressure in the chamber portion 22 acts on the head portion 88' of the relief valve 72 through the passage 94'. If sufficient fluid pressure is present in the chamber portion 22, the fluid pressure causes the valve member 76' to overcome the bias of the spring 126 and causes the head portion 88' to be moved away from the conical face 82'. This allows fluid to flow along the passage 94' past the head portion 88', and establishes fluid communication between the chamber portion 22 and the portion of the bore 68 between the relief valves 70 and 72.

When both of the head portions 88 and 88' are located away from their respective conical faces 82 and 82' fluid communication between the chamber portions 20 and 22 is established. Specifically, the pressurized fluid in the chamber portion 22 is vented through the passage 94' in the valve seat 74', past the head portion 88', through the portion of the bore 68 between the relief valves 71 and 70, past the head portion 88, through the passage 94 and through the slot 86 and into chamber portion 20 which is vented to the reservoir 42 through the valve 38. Obviously if the piston 18 was moving in the opposite direction, the reverse would occur and chamber portion 20 would be vented to chamber portion 22.

Adjustment of the relief valves 70 and 72 (FIGS. 4–6) can be made by sliding the respective valve seat 74, 74' relative to the respective connector 100, 100'. This adjusts the press-fit connection in the respective relief valve 70, 72. Typically, the force necessary to overcome the press fit connection is 500–2500 lbs. This can be done in the present embodiment by merely rotating the steering wheel of the vehicle in which the steering gear 10 is mounted. Rotation of the steering wheel and movement of the piston 18 can cause the respective valve seat 74, 74' to be moved relative to the respective connector 100, 100', if the steering stops have not yet engaged.

For example, as the steering wheel is turned in a direction to cause the relief valve 70 (FIG. 3) to move toward the wall 128. The tip portion 92 of the valve member 76 will engage the wall 128 and unseat the head portion 88 from the conical face 82. If, however, the steering stops have not engaged, the steering wheel can still be rotated and the piston 18 will continue to move.

The continued rotation of the steering wheel with sufficient force and movement of the piston 18 will cause the end 84 of the valve member 74 to engage the wall 128 (FIG. 4) and will cause the relief valve 70 to move axially relative to the connector 100 and the piston 18 (FIG. 5). Specifically, the press-fit connection between the valve seat 74 and the connector 100 will be overcome by continued movement of piston 18 due to the manual turning of the steering wheel. This relative movement of the valve seat 74 and the connector 100 causes the retainer ring 120 to move away from the connector 100 to a position such as shown in FIG. 5. Also, a further burnishing effect may occur. The turning of the steering wheel and positioning of the valve seat 72 can continue until the steering stops are engaged.

After the steering stops engage, a new position of the valve seat 74 relative to the connector 100 and the piston 18 is established. With the new position of the valve seat 74, the piston 18 can be moved closer to the wall 128, thus increasing the length of its work strokes, prior to the tip portion 98 of the valve member 76 engaging the wall 128.

The press-fit connection between the valve seat 74 and connector 100 retains the valve seat 74 in place at the new position (FIG. 6) when subjected to the bias of spring 126 and operating fluid pressure. However, the press-fit connection allows subsequent adjustments of the valve seat 74 as described above for the typical life of the relief valve 70. Specifically, the coating 80 of the layers of zinc phosphate 80a and oil 80b prevent seizing of the valve seat 74 to the connector 100. Moreover, the coating 80 provides sufficient friction to prevent relative movement of the valve seat 74 relative to the connector 100 until the predetermined adjusting force is applied. As mentioned above, this force is typically 500–2500 lbs.

Typically, the life of relief valve 70 will include 10 adjustment cycles of the valve seat 74. Each cycle is one complete back and forth movement of the valve seat 74 relative to the connector 100. It will be understood that once the valve seat 74 is adjusted all the way in relative to the piston 18, the connector 100 and the relief valve 70 may be removed from the piston 18 the valve seat 74 may be moved outward relative to the connector 100 by overcoming the press-fit connection, and the connector 100 and the relief valve 70 may be reinstalled at an initial position relative to the piston 18 (FIG. 2).

A similar adjustment of the relief valve 72 will occur by turning the steering wheel in the opposite direction and causing the valve member 76' and the valve seat 74' to move relative to the connector 100'. In this manner the relief valves 70 and 72 may be adjusted to open and vent the chamber portions 20 and 22 when the piston 18 is at the limits of its movement and the steering stops are engaged.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:

a housing defining a chamber, piston means for dividing the chamber into first and second pressure chamber portions, said piston means being movable through a work stroke in opposite directions in said chamber, means for directing fluid pressure into said first chamber portion and venting said second chamber portion to effect movement of said piston means in a first direction and for directing fluid pressure into said second chamber portion and venting said first chamber portion to effect movement of said piston means in a second direction, relief valve means for communicating said first and second chamber portions when said piston means is near the end of its work stroke, said relief valve means comprising a valve member and a valve seat which are relatively movable between a closed position blocking communication between said first and second chamber portions and an open position establishing communication between said first and second chamber portions when said piston means reaches the end of its work stroke, and a press-fit connection between said piston means and said valve seat for preventing relative movement between said valve seat and said piston means during application of force to said valve seat less than a predetermined amount and for permitting relative movement between said valve seat and said piston means during application of force to said valve seat greater than the predetermined amount, and zinc phosphate on one of said valve seat and said piston means at said connection for resisting seizing of said valve seat and said piston means at said connection.

2. An apparatus as set forth in claim 1, wherein said zinc phosphate is on said valve seat.

3. An apparatus as set forth in claim 2, wherein said zinc phosphate forms an outer layer of said valve seat.

4. An apparatus as set forth in claim 3, wherein the amount of said zinc phosphate in said layer is about 100 mg per square foot of surface area.

5. An apparatus as set forth in claim 1, including oil between said valve seat and said piston means.

6. An apparatus as set forth in claim 5, wherein said zinc phosphate is on said valve seat.

7. An apparatus as set forth in claim 1, wherein said predetermined amount of force is 500–2,500 lbs.

8. An apparatus as set forth in claim 1, wherein said piston means includes a piston with a passage and a connector in said passage, said connection being between said connector and said valve seat.

9. An apparatus comprising:

a housing defining a chamber, piston means for dividing the chamber into first and second pressure chamber portions, said piston means being movable through a work stroke in opposite directions in said chamber, means for directing fluid pressure into said first chamber portion and venting said second chamber portion to effect movement of said piston means in a first direction and for directing fluid pressure into said second chamber portion and venting said first chamber portion to effect movement of said piston means in a second direction, relief valve means for communicating said first and second chamber portions when said piston means is near the end of its work stroke, said relief valve means comprising a valve member and a valve seat which are relatively movable between a closed position blocking communication between said first and second chamber portions and an open position establishing communication between said first and second chamber portions when said piston means reaches the end of its work stroke, and adjusting means for enabling adjustment of said relief valve means relative to said piston means, said adjusting means comprising a press-fit connection between said piston means and said valve seat for preventing relative movement between said valve seat and said piston means during application of force to said valve seat less than a predetermined amount and for permitting relative movement between said valve seat and said piston means during application of force to said valve seat greater than the predetermined amount, and zinc phosphate on one of said valve seat and said piston means at said connection and oil between said valve seat and said piston means at said connection for resisting seizing of said valve seat and said piston means at said connection for a predetermined number of adjustments of said valve seat and for providing sufficient friction to prevent relative movement between said valve seat and said piston means upon application of force less than the predetermined level subsequent to each of these predetermined number of adjustments of said valve seat.

10. An apparatus as set forth in claim 9, wherein said zinc phosphate is on said valve seat.

11. An apparatus as set forth in claim 9, wherein said zinc phosphate is formed as a layer on said one of said valve seat and said piston.

12. An apparatus as set forth in claim 11, wherein the amount of said zinc phosphate in said layer is about 100 mg per square foot of surface area.

13. An apparatus as set forth in claim 9, wherein said predetermined amount of force is 500–2,500 lbs.

14. An apparatus as set forth in claim 9, wherein said predetermined number of adjustments includes approximately 10 adjustment cycles, wherein each adjustment cycle is one complete back and forth movement of said valve seat relative to said piston means.

15. An apparatus as set forth in claim 9, wherein said piston means includes a piston with a passage and a connector in said passage, said connection being between said connector and said valve seat.

16. A method of making a hydraulic power apparatus which includes an adjustable press-fit connection between a valve member and a piston element, said method comprising:

placing zinc phosphate on one of the valve member and the piston element at a location to be press-fit;

placing oil on one of the valve member and the piston element at the location to be press-fit;

press-fitting the valve member and the piston element together; and placing the press-fit piston element and valve member into the hydraulic apparatus.

17. A method as set forth in claim 16, wherein said step of press-fitting the valve member and the piston element includes burnishing as the valve member is moved relative to the piston element.

18. A method as set forth in claim 16, wherein said step of placing zinc phosphate on one of the valve member and the piston element includes placing an outer layer of zinc phosphate on said valve member, said step of press-fitting the valve member and the piston element is done without removal of the material of the valve member covered by the outer layer of zinc phosphate.

19. A method as set forth in claim 16 wherein said step of press-fitting the valve member and the piston element includes applying 500–2,500 lbs. of force to the valve member.

20. A method as set forth in claim 16, wherein said step of placing the press-fit piston element and valve member into the hydraulic apparatus includes securing the piston element into a Passage of a movable piston.

* * * * *